United States Patent
Choi (10) Patent No.: US 11,391,518 B2
(45) Date of Patent: Jul. 19, 2022

(54) METHOD OF OPERATING A HEAT EXCHANGER

(71) Applicant: ALFA LAVAL CORHEX LTD, Daejeon (KR)

(72) Inventor: Young-Jong Choi, Daejeon (KR)

(73) Assignee: Alfa Laval Corhex Ltd., Daejeon (KR)

( * ) Notice: Subject to any disclaimer, the term of this patent is extended or adjusted under 35 U.S.C. 154(b) by 252 days.

(21) Appl. No.: 16/434,235

(22) Filed: Jun. 7, 2019

(65) Prior Publication Data
US 2019/0285352 A1   Sep. 19, 2019

Related U.S. Application Data

(62) Division of application No. 14/646,601, filed as application No. PCT/KR2013/010551 on Nov. 20, 2013, now Pat. No. 10,365,045.

(30) Foreign Application Priority Data

Nov. 22, 2012  (KR) .................. 10-2012-0132938

(51) Int. Cl.
*F28D 9/00*  (2006.01)
*F02M 21/02*  (2006.01)
(Continued)

(52) U.S. Cl.
CPC ....... *F28D 9/0093* (2013.01); *F02M 21/0215* (2013.01); *F02M 21/06* (2013.01);
(Continued)

(58) Field of Classification Search
CPC ..... B63H 21/38; F28D 9/0093; F28D 7/0066; F02M 21/0215; F02M 21/06
See application file for complete search history.

(56) References Cited

U.S. PATENT DOCUMENTS 5,152,060 A  10/1992  Schubert et al.
5,462,113 A *  10/1995  Wand .............. F28D 9/005
                                                165/140
(Continued)

FOREIGN PATENT DOCUMENTS

CN  1079532 C  2/2002
CN  1130541 C  12/2003
(Continued)

OTHER PUBLICATIONS

Office Action (Notice of Reasons for Rejection) dated Jan. 5, 2018, by the Japanese Patent Office in corresponding Japanese Patent Application No. 2017-101619, and an English translation of the Office Action (10 pages).
(Continued)

*Primary Examiner* — Jon T. Schermerhorn, Jr.
(74) *Attorney, Agent, or Firm* — Buchanan Ingersoll & Rooney PC (57) ABSTRACT

A method of operating a heat exchanger involves conveying a first fluid having a first temperature along spaced apart first passages of the heat exchanger and conveying a second fluid along spaced apart second passages of the heat exchanger while the first fluid is being conveyed along the first passages to transfer heat from the second fluid to the first fluid. The method also includes conveying a fluid along the third passages when the temperature of the second fluid in at least some of the second passages is below a predetermined temperature to transfer heat from the fluid being conveyed along the third passages to the second fluid.

7 Claims, 4 Drawing Sheets

(51) Int. Cl.
  *F28F 19/00* (2006.01)
  *F02M 21/06* (2006.01)
  *F28D 21/00* (2006.01)
  *B63H 21/38* (2006.01)
  *F28F 23/02* (2006.01)

(52) U.S. Cl.
  CPC .......... *F28D 9/0037* (2013.01); *F28F 19/006* (2013.01); *B63H 21/38* (2013.01); *F28D 2021/0064* (2013.01); *F28F 23/02* (2013.01); *F28F 2275/061* (2013.01); *Y02T 10/30* (2013.01)

(56) References Cited

U.S. PATENT DOCUMENTS

| | | | |
|---|---|---|---|
| 6,079,629 | A | 6/2000 | Morikawa et al. |
| 6,142,221 | A * | 11/2000 | Johansson ............. F28D 9/0093 165/140 |
| 6,305,466 | B1 * | 10/2001 | Andersson ............. F28D 9/005 165/140 |
| 8,381,803 | B2 | 2/2013 | Kim et al. |
| 2010/0258284 | A1 * | 10/2010 | Krantz .................. F28F 3/083 165/166 |
| 2012/0138266 | A1 * | 6/2012 | Yamada ................. F28F 13/08 165/104.11 |
| 2013/0192806 | A1 | 8/2013 | Noishiki et al. |

FOREIGN PATENT DOCUMENTS

| | | |
|---|---|---|
| EP | 0 212 878 A1 | 3/1987 |
| EP | 1302634 A1 | 4/2003 |
| JP | S59-189295 A | 10/1984 |
| JP | 6237687 A | 2/1987 |
| JP | H03-500861 A | 2/1991 |
| JP | 07218003 A | 8/1995 |
| JP | H11-051578 A | 2/1999 |
| JP | 2000-356482 A | 12/2000 |
| JP | 2002-506196 A | 2/2002 |
| JP | 2002-147851 A | 5/2002 |
| JP | 2005-505743 A | 2/2005 |
| JP | 2005-291546 A | 10/2005 |
| JP | 2006-220319 A | 8/2006 |
| JP | 2009-146906 A | 7/2009 |
| JP | 2010-511137 A | 4/2010 |
| JP | 2010-117126 A | 5/2010 |
| JP | 2011-169526 A | 9/2011 |
| JP | 2013-155971 A | 8/2013 |
| JP | 2016-183811 A | 10/2016 |
| JP | 6184511 B2 | 8/2017 |
| KR | 20100132353 A | 12/2010 |
| KR | 10-2012-0075838 A | 7/2012 |
| WO | 99/46550 A1 | 9/1999 |
| WO | 03/033985 A1 | 4/2003 |
| WO | 2008/069426 A1 | 6/2008 |
| WO | 2009/151399 A1 | 12/2009 |
| WO | 2010/040819 A1 | 4/2010 |
| WO | 2011/156279 A1 | 12/2011 |
| WO | 2012/026828 A1 | 3/2012 |
| WO | 2014081182 A1 | 5/2014 |

OTHER PUBLICATIONS

Written Submission of Publications dated Oct. 10, 2017 in corresponding Japanese Patent Application No. 2017-101619, and an English Translation of the Written Submission of Publications (23 pages).
Third Party Notification dated Oct. 30, 2017, by the Japanese Patent Office in corresponding Japanese Patent Application No. 2017-101619 (1 page).
Office Action (Notice of Reasons for Rejection) dated May 30, 2016, by the Japanese Patent Office in corresponding parent Japanese Patent Application No. 2015-543965, and an English Translation of the Office Action (14 pages).
Search Report issued by the European Patent Office in corresponding European Patent Application No. 13 856 397.8 (3 pages).
Office Action (First Office Action) dated Mar. 1, 2017, by the Chinese Patent Office in corresponding Chinese Patent Application No. 201380060920.6, and an English Translation of the Office Action and Search Report (12 pages).

* cited by examiner

METHOD OF OPERATING A HEAT EXCHANGER

CROSS REFERENCES TO RELATED APPLICATIONS

This application is a divisional application of U.S. application Ser. No. 14/646,601 filed on May 21, 2015, which is a U.S. national stage application based on International Application No. PCT/KR2013/010551 filed on Nov. 20, 2013, and claims priority to Korean Application No. 10-2012-0132938 filed on Nov. 22, 2012, the entire content of all three of which is incorporated herein by reference.

TECHNICAL FIELD

The present invention relates to a three-dimensional (3-D) channel gas heat exchanger fabricated by performing diffusion bonding on a metal plate in which fine passages are formed using photoetching and then welding a header to the metal plate in order to vaporize LNG or cool process gas having a high temperature for a chemical process.

More particularly, the present invention relates to a 3-D channel gas heat exchanger, which can be used under an extremely low temperature or high temperature and high pressure environment, has a very smaller volume than an existing Shell & Tube type heat exchanger, can minimize a freeze clogging phenomenon in a heat source or a cold source flowing into passages or a fatigue fracture phenomenon due to a difference in temperature and pressure, and has a high heat transfer coefficient and an improved pressure-resistant property through intermittent forced separation and mixing.

BACKGROUND DISCUSSION

International Maritime Organization announced an MARPOL (Prevention of Pollution from Ship) rule in order to reduce atmospheric pollution from a vessel and makes an effect to reduce atmospheric pollution to a 5 to 20% level of current emission quantity. Accordingly, worldwide researches are being carried out in order to replace existing heavy fuel oil-series bunker oil, that is, fuel for vessels, with Liquefied Natural Gas (LNG).

In line with this regulation, a small vessel using LNG as fuel has emerged in the coast of Europe. A small vessel has an LNG fuel tank having a small capacity and uses fuel gas of low pressure because the small vessel uses a small amount of LNG and has a short shipping service distance. In contrast, a large vessel needs to use a 2-cycle engine using a direct driving method in order to increase fuel efficiency because the large vessel requires an LNG fuel tank having a large capacity, uses a very large amount of fuel, and has great propelling force.

In order to obtain natural gas of high pressure, a high-pressure heat exchanger for vaporizing extremely low temperature materials is necessary. Heat exchangers satisfying this requirement include a Shell & Tube type heat exchanger developed about 100 years ago and now being used, a coiled tube type heat exchanger having a plurality of tube bundles, and a fin-tube type heat exchanger in which a pin is attached to a tube.

Furthermore, as a contrary concept, in many plants, in order to cool or condense a process gas having a high temperature and high pressure, a process of making a cold source, such as water or a refrigerant, flow into the secondary-side passage of a heat exchanger is chiefly used.

It is reported that an existing heat exchanger, such as the Shell & Tube type heat exchanger or the coiled tube type heat exchanger, is not suitable for a high-pressure LNG vaporizer for a natural gas-propelled vessel due to the following problems.

First, in the Shell & Tube type heat exchanger designed and fabricated to be used under a high pressure and extremely low temperature environment, fatigue fracture is likely to occur in a joint due to a difference between the heat capacity of a thick tube sheet used to withstand high pressure and a relatively less thick tube.

Second, the Shell & Tube type heat exchanger, etc. inevitably depend on the length of a tube in order to increase a heating area and require a large size and heavy weight due to low compactness.

Third, the size of an insulating boxes for clogging the entrance and exist of heat is further increased due to a large size, and thus a cost and an installation space within a vessel are greatly increased.

The problems are likewise generated in uses for vaporizing high pressure and low temperature materials and condensing or cooling high pressure and high temperature gas.

Figure 1:
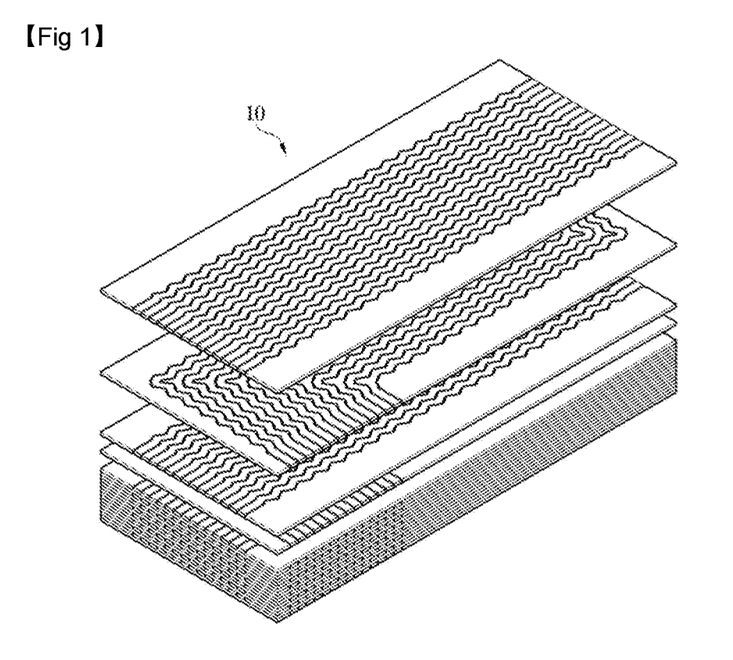
FIG. 1 is a perspective view of a conventional heat exchanger.
Figure 2:
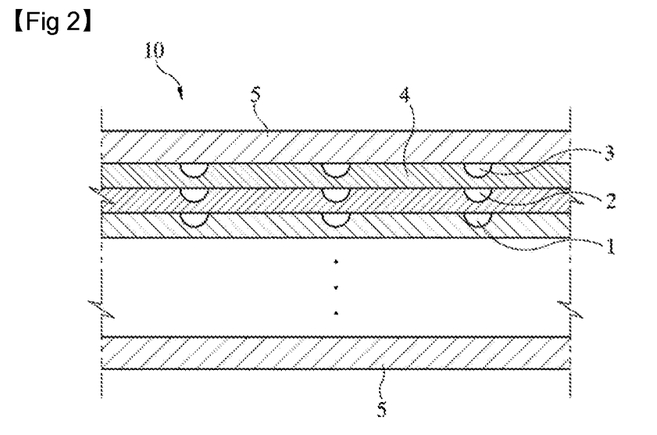
FIG. 2 is a front cross-sectional view of the conventional heat exchanger.

In addition to the above-described problems, there are some problems difficult to be solved in applying a Printed Circuit Heat Exchanger (PCHE) 10 that is known to be suitable for a high pressure heat exchanger shown in FIGS. 1 and 2. Accordingly, a system adopting the PCHE 10 has not yet emerged, and this problem is also present in a process gas cooler for a chemical plant as well as a natural gas vaporizer for a vessel.

First, icing, that is, a phenomenon in which a surface of a passage 2 through which a heat source for heating temperature of LNG flowing into a passage 1 at an extremely low temperature passes is frozen is generated. In order to avoid this phenomenon, a large passage having an average hydraulic diameter of 2 mm or more, that is, the size of a passage that can be fabricated by an existing photoetching process, is necessary. The passage having the large average hydraulic diameter makes it difficult to adopt the existing PCHE 10 because it does not fall within a technical limit and an economic limit of a photoetching process.

Second, since a heat source (or cold source) fluid used to vaporize or cool gas passes through the small passage 2 at low speed for a long time, a heat transfer rate is significantly reduced because a clogging phenomenon in which the passage 2 is clogged by an alien substance and a fouling phenomenon in which the inside of the passage is covered with fur become significant. In particular, this fouling problem is a problem that causes the largest claims after the PCHE has been commercialized as a cooler for the process gas of a plant. Furthermore, the problem can likewise occur even in high pressure LNG vaporizers that have not yet been developed and applied so far.

The PCHE 10 must be cleaned by high pressure washing or combustion using high temperature gas due to the clogging phenomenon and the fouling phenomenon and then reassembled. To this end, a corresponding vessel or plant must be stopped, but it is difficult to stop the entire system due to the nature of the system.

Accordingly, there is a need for a solution to the problems.

SUMMARY

One aspect of the disclosure involves a method of operating a 3-D channel gas heat exchanger in which the 3-D channel gas heat exchanger comprises: a plurality of heat exchange plates for exchanging heat on opposite sides of the heat exchange plates; and a plurality of passages between the plurality of heat exchange plates, the plurality of passages comprising first passages, second passages and third passages. The method comprises: conveying a first fluid having a first temperature through the first passages of the 3-D channel gas heat exchanger; conveying a second fluid through the second passages; conducting heat exchange between the first fluid and the second fluid to transfer heat to the first fluid having the first temperature; and preventing freezing in the second passages by conveying a freezing-preventing fluid through the third passages and transferring heat from the fluid in the third passages to the second fluid in the second passages when a temperature of the second fluid is below a predetermined temperature.

According to another aspect, a method of operating a heat exchanger comprises conveying a first fluid along a plurality of spaced apart first passages of the heat exchanger, wherein the first passages lie in a first plan. The heat exchanger also comprises a plurality of heat exchange plates for exchanging heat between opposite sides of the heat exchange plates and a plurality of passages separated from one another by portions of the heat exchange plates. The plurality of passages include the first passages, a plurality of spaced apart second passages that lie in a second and spaced apart third passages that lie in a third plane. The first plane is between the second plane and the third plane, and each of the first passages is aligned with one of the second passages and one of the third passages in a common plane. The method also comprises conveying a second fluid along the spaced apart second passages while the first fluid is being conveyed along the first passages to transfer heat from the second fluid to the first fluid, and transferring heat from a fluid being conveyed along the third passages to the second fluid being conveyed along at least some of the second passages when a temperature of the second fluid being conveyed along the at least some of the second passages is below a predetermined temperature, with the fluid being conveyed along the third passages during the transferring of the heat being at a temperature higher than the predetermined temperature.

Another aspect involve a method comprising: conveying a first fluid having a first temperature along spaced apart first passages of a heat exchanger, with the heat exchanger also comprising a plurality of heat exchange plates for exchanging heat between opposite sides of the heat exchange plates and a plurality of passages defined by the plurality of heat exchange plates, the plurality of passages including the first passages, spaced apart second passages and spaced apart third passages. The method additionally includes conveying a second fluid along the spaced apart second passages while the first fluid is being conveyed along the first passages to transfer heat from the second fluid to the first fluid, and conveying a fluid along the third passages when a temperature of the second fluid in at least some of the second passages is below a predetermined temperature to transfer heat from the fluid being conveyed along the third passages to the second fluid in the at least some of the second passages to heat the second fluid in the at least some of the second passages.

Also disclosed is a 3-D channel gas heat exchanger which can minimize a fatigue fracture phenomenon under an extremely low temperature or high temperature and high pressure environment which is inherent in the existing Shell & Tube type heat exchanger, minimize a freeze clogging phenomenon in a heat source supply passage or clogging attributable to an alien substance, and a clogging possibility due to the deformation of a fluid used, maximize a heat transfer characteristic through the repetitive division and mixing of a flue within the passage, and minimize the volume by increasing an average hydraulic diameter of a passage through which a heat source flows to an average hydraulic diameter of 2 mm or more, that is, a limit of the existing PCHE for technical and economic reasons.

According to one aspect, a 3-D channel gas heat exchanger used in a vessel includes a plurality of heat exchange plates configured to have heating surface units for exchanging heat formed on one sides of the heat exchange plates and a plurality of passages that are formed in between the plurality of heat exchange plates and wherein the plurality of passages comprise, first passages configured to convey a first fluid having a first temperature through the first passages, second passages configured to convey a second fluid through the second passages for transferring heat to the first fluid having the first temperature; and third passages configured to prevent freezing in the second passages by transferring heat to at least some of the second passages 160 when a temperature (T) of the second fluid is below a predetermined temperature value (Tref).

Furthermore, a shape of the plurality of heat exchange plates may be at least one of a rectangle, a square, and an oval, and a plurality of passages grooves for providing the plurality of passages may be formed on one sides or both sides of the plurality of heat exchange plates.

Furthermore, the plurality of passages grooves may be formed by at least one of an etching method, a punching method, and a mechanical processing method.

Furthermore, the plurality of heat exchange plates may include a first heat exchange plate configured to form the first passages, a second heat exchange plate disposed close to the first heat exchange plate and configured to form the second passages, and a third heat exchange plate disposed close to the second heat exchange plates and configured to form the third passages.

Furthermore, the heating surface unit of the second heat exchange plate may include a solid unit extended in a straight line and a crossing angle unit curved from the solid unit at a specific angle, the solid unit and the crossing angle unit may be repeated form, the length of the solid unit may be 8 to 200 mm, and the length of the crossing angle unit may be 2 to 5 mm.

Furthermore, the first passages, the second passages, and the third passages may be plural, the plurality of second passages may be disposed close to the plurality of first passages, and the plurality of third passages may be disposed close to the plurality of second passages.

Furthermore, each of the second passages may have a diameter of 2 to 10 mm.

Furthermore, the 3-D channel gas heat exchanger may be used in a vessel, the first fluid may be LNG, and the second fluid may be at least one of warm water, high temperature steam, and a mixture of water and antifreeze.

Furthermore, the 3-D channel gas heat exchanger may be used in a gas plant, the first fluid may be at least one of propane, ethane, ammonia, and cold water, and the second fluid may be a high-temperature gas.

Furthermore, the 3-D channel gas heat exchanger may further include covers for supporting the plurality of heat exchange plates outsides of the plurality of stacked heat exchange plates.

In accordance with the 3-D heat exchanger of the present invention, a passage clogging phenomenon due to freezing or a clogging phenomenon due to impurities can be significantly improved because the size of the passage is much larger than a range in which a common PCHE can be fabricated.

Furthermore, since LNG passages for an extremely low temperature and reserved passages through which nothing flows are placed near the heat exchange medium passage (second passage), one side of the heat exchange medium passage(second passage) is protected from cool air and a sloe of a surrounding temperature becomes gentle. Accordingly, there are advantages in that a passage clogging phenomenon duet freezing can be improved and heat stress or a heat shock can be reduced.

Furthermore, the solid part of the heat exchange plate is long and the crossing angle part of the heat exchange plate is short so that forced agitation is performed. Accordingly, there are advantages in that a phenomenon in which the passage is clogged by an alien substance and a phenomenon in which the passage is covered with fur can be significantly reduced and heat transfer coefficient can be maximized by the forced agitation of a fluid.

Effects that may be achieved by the present invention are not limited to the above-described effects, and those skilled in the art to which the present invention pertains will readily appreciate other effects that have not been described from the following description.

DETAILED DESCRIPTION

Hereinafter, exemplary embodiments of the present invention are described in detail with reference to the accompanying drawings. In describing an operation principle of the exemplary embodiments of the present invention, however, when a detailed description of related functions or constructions is determined to make unnecessarily vague the subject matter of the present invention, the detailed description will be omitted.

Furthermore, the same reference numerals are used to denote elements having similar functions and operations throughout the drawings. In the entire specification, when it is described that one element is coupled with the other element, the one element may be directly coupled with the other element or may be indirectly coupled with the other element through a third element.

Furthermore, when it is said that an element includes any element, it means that the element does not exclude another element, but may further include another element unless described otherwise.

A Printed-circuit Heat Exchange (PCHE) developed to supplement the conventional Shell & Tube type heat exchanger can have a phenomenon in which a surface of a passage through which a heat source for heating temperature of LNG flowing into a passage at an extremely low temperature passes is frozen is generated and thus requires a large passage having an average hydraulic diameter of 2 mm or more, that is, the size of a passage that can be fabricated by an existing photoetching process in order to avoid this phenomenon. However, the passage having the large average hydraulic diameter makes it difficult to adopt the existing PCHE because it does not fall within a technical limit and an economic limit of a photoetching process.

Furthermore, in the heat exchange plate of a common heat exchanger, a heat transfer rate is significantly reduced because a clogging phenomenon in which a passage is clogged by an alien substance and a fouling phenomenon in which the inside of the passage is covered with fur become significant.

The present invention has been made to solve the conventional problems, and an object of the present invention is to provide a 3-D channel gas heat exchanger, which can minimize a fatigue fracture phenomenon under an extremely low temperature or high temperature and high pressure environment inherent in the existing Shell & Tube type heat exchanger, minimize a freeze clogging phenomenon in a heat source supply passage or clogging attributable to an alien substance and a clogging possibility due to the deformation of a fluid used, maximize a heat transfer characteristic through the repetitive division and mixing of a flue within the passage, and minimize the volume by increasing an average hydraulic diameter of the passage of an existing Shell & Tube type heat exchanger through which a heat source flows to an average hydraulic diameter of 2 mm or more, that is, a limit of the existing PCHE for technical and economic reasons.

The construction and functions of a 3-D channel gas heat exchanger 100 in accordance with a first embodiment of the present invention are described below.

Figure 3:
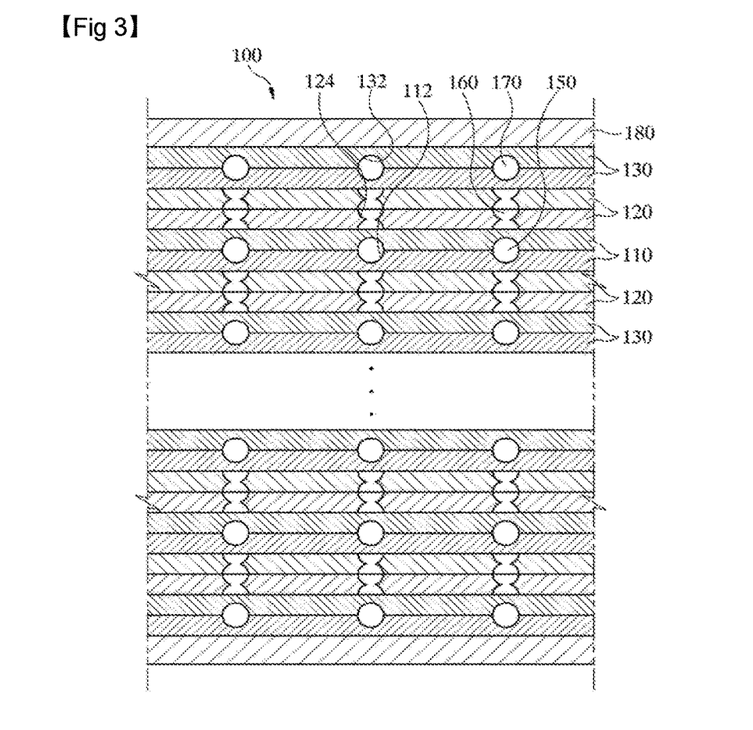
FIG. 3 is a front cross-sectional view of a 3-D channel gas heat exchanger in accordance with a first embodiment of the present invention.

Meanwhile, FIG. 3 is a front cross-sectional view of the 3-D channel gas heat exchanger in accordance with the first embodiment of the present invention.

First, as shown in FIG. 3, the 3-D channel gas heat exchanger 100 can include first heat exchange plates 110, second heat exchange plates 120, third heat exchange plates 130, and covers 180.

The elements of FIG. 3 are not essential, and the 3-D channel gas heat exchanger 100 having a smaller number or larger number of elements than the elements of FIG. 3 can be implemented.

Each of the elements shown in FIG. 3 is described below.

The plurality of first, second, and third heat exchange plates 110, 120, and 130 is stacked, and the covers 180 are covered on both outsides of the first, second, and third heat exchange plates 110, 120, and 130.

The first, second, and third heat exchange plates 110, 120, and 130 can have any one of a rectangle, a square, and an oval, and a heating surface unit is formed in each of the first, second, and third heat exchange plates 110, 120, and 130.

The shape of the first, second, and third heat exchange plates 110, 120, and 130 can be changed into a trapezoid, a lozenge, a parallelogram, or a variety of polygonal or circular shapes, if necessary.

Here, first passage grooves 112 each having a semicircle are formed in the first heat exchange plate 110. Furthermore, second passage grooves 124 formed in each of the second heat exchange plates 120 are semicircular concave grooves that are symmetrically concaved up and down, thus becoming the shapes of the second passage grooves 124 shown in FIG. 3.

Third passage grooves 132, that is, semicircular grooves, are formed in each of the third heat exchange plates 130 as in the first heat exchange plate 110.

The first, second, and third passage grooves 112, 124, and 132 can be manufactured by at least one of an etching method, a punching method, and a mechanical processing method.

More particularly, the first, second, and third passage grooves 112, 124, and 132 are processed by making necessary parts photosensitive by pasting a photoresist film on surfaces of the heat exchange plates 110, 120, and 130 and then corroding non-photosensitive parts using a photoetching method.

Furthermore, the first and second passage grooves 112, 124, and 132 are formed at specific intervals in order to facilitate heat exchange.

First to third passages 150, 160, and 170 are formed in the first passages 110, the second passages 120, and the third passages 130, respectively. The first to third passages 150, 160, and 170 are stacked and formed in the plurality of heat exchange plates 110, 120, and 130.

The first, second, and third passages 150, 160, and 170 are formed in lines that are close to each other to a maximum extent in order to maximize heat transfer.

If the 3-D channel gas heat exchanger 100 is used in a vessel, LNG can flow through the first passages 150 and a heat exchange medium(second fluid) for providing a heat source for vaporizing the LNG flowing through the first passages 150 flows through the second passages 160. Warm water and high temperature steam can be used as the heat exchange medium.

In contrast, unlike in the 3-D channel gas heat exchanger 100 used in a vessel, if the 3-D channel gas heat exchanger 100 is used in a gas plant, a refrigerant, such as propane, ethane, ammonia, or water that is a low temperature fluid, flows through the first passages 150 and high temperature gas for transferring heat to the low temperature fluid flowing through the first passages 150 flows through the second passages 160.

The third passage 170 is a reserved passage and is used when a phenomenon in which the second passage 160 is clogged or when the first passage 150 does not sufficiently transfer heat to the second passage 160 for a reason of fouling.

More particularly, the third passage 170 is disposed close to the second passage 160. If a phenomenon in which a temperature (T) of the second fluid is below a predetermined temperature value (Tref) is generated in the second passage 160 due to a freeze phenomenon, the third passage 170 supplies heat to the second passage 160 in order to melt a part of the second passage 160 where the freeze phenomenon was generated so that the second passage 160 can normally operate.

As described above, the first passages 150 are formed by disposing a pair of the first heat exchange plates 110 so that the first passage grooves 112 formed in the pair of first heat exchange plates 110 face each other.

More particularly, the first passage grooves 112 formed in the first heating surface unit (not shown) of the first heat exchange plate 110 in a semicircular form are disposed to face each other, with the result that the two passage grooves 112 are combined to form each of the first passages 150, that is, one large circular passage. Likewise, a pair of the third heat exchange plates 130 is disposed to face each other, thus forming the third passages 170.

Likewise, a pair of the second heat exchange plates 120 is disposed to form the second passages 160 each having a 3-D etched shape, as shown in FIG. 3.

The second heat exchange plate 120 is closely adhered to one side of the first heat exchange plate 110 providing the first passages 150.

Furthermore, the third heat exchange plate 130 providing the third passages 170 is disposed on a side opposite to the side on which the second heat exchange plate 120 is closely adhered to the first heat exchange plate 110, so that the third passages 170 are formed.

As described above, the plurality of first, second, and third heat exchange plates 110, 120, and 130 having the same arrangement structure are disposed. The covers 180 for supporting the first, second, and third heat exchange plates 110, 120, and 130 in structure are disposed at both ends of the first, second, and third heat exchange plates 110, 120, and 130.

As a result, the first passages 150 and the second passages 160 are disposed close to each other, and the second passages 160 are disposed close to the third passages 170. Here, a fluid does not flow through the third passages 170 at normal times, but a fluid flows through the third passages 170 when a clogging phenomenon is generated.

As described above, the third passages 170, that is, reserved passages, are placed on one side of the second passages 160, that is, heat exchange medium passages, so that the second passages 160 are protected from cool air. Accordingly, a passage clogging phenomenon attributable to freezing can be minimized.

Figure 4:
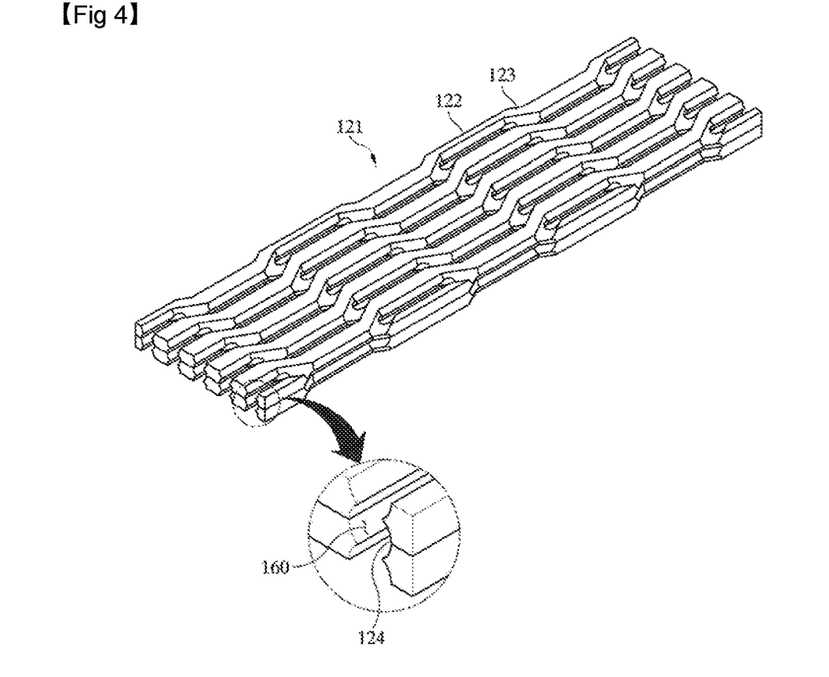
FIG. 4 is a perspective view of the heating surface units of second heat exchange plates shown in FIG. 3.

Meanwhile, FIG. 4 is a perspective view of the heating surface units 121 of the second heat exchange plates 120 shown in FIG. 3. Furthermore, FIG. 5 is a plan view of the heating surface units 121 shown in FIG. 4.

Figure 5:
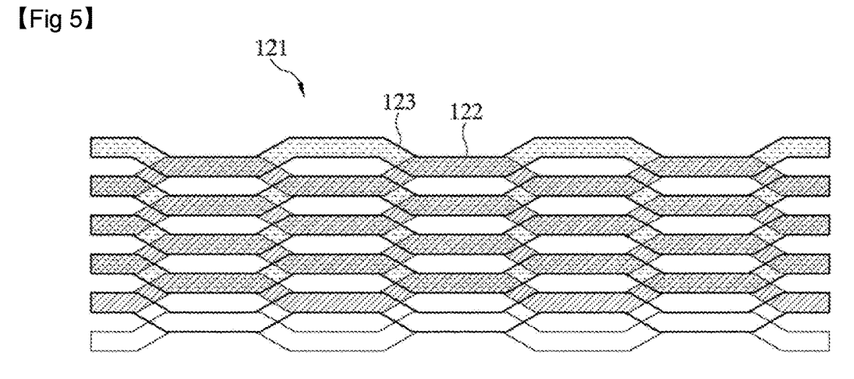
FIG. 5 is a plan view of the heating surface units shown in FIG. 4.

As shown in FIGS. 4 and 5, particularly, pairs of the heating surface units 121 of the second heat exchange plates 120 configured to have the same shape and have a plurality of through holes formed therein are stacked to provide the second passage 160.

In the present invention, the heating surface units 121 of the second heat exchange plates 120 are curved left or right gently about 30 at intervals of about 10 mm.

More particularly, each of the heating surface units 121 includes solid units 122 extending in a straight line and crossing angle units 123 curved at a specific angle from the solid unit 122. The solid unit 122 and the crossing angle unit 123 are repeated to generally form a passage having a wavy shape. That is, as seen in FIGS. 4 and 5, each of the heating surface units 121 extends between opposite ends of the heat exchange plate. Each of the heating surface units comprises the solid units 122, which are first portions of the heat exchange plate that each extend in a straight line, and the crossing angle units 123, which are second portions of the heat exchange plate that are angled relative to the first portions so that the second portions 123 of the heat exchange plate are other than parallel to the first portions 122 of the heat exchange plate. FIGS. 4 and 5 also show that the heating surface units 121 are arranged side-by-side with the passages and through holes (for example the second passages 160 and associated through holes) positioned between the first and second portions 112, 123 of the side-by-side heating surface units 121.

The length of the solid unit 122 is 8 to 200 mm, and the length of the crossing angle unit 123 is 2 to 5 mm.

As the above, the length of the solid unit 122 is extended maximally and the length of the crossing angle unit 123 is shortened minimally, thereby the manufacture could be facilitated and the rigidity and the pressure resisting quality could be improved, therefore The effect wherein the heat exchange plate is not bent easily could be achieved.

Also, the solid unit 122 is manufactured to be long more than the crossing angle unit 123, thereby a clogging phenomenon in which the passage is clogged by an alien substance and a fouling phenomenon in which the inside of the passage is covered with fur could be significantly reduced, therefore the heat transfer efficiency can be highly improved.

Furthermore, an average hydraulic diameter of the second passage 160 provided by stacking the heating surface units 121 is about 2 to 10 mm, that is, 2 mm or more that is a limit of a common PCHE. Accordingly, a freeze clogging phenomenon occurring in the second passage 160 for supplying a heat source can be minimized.

Figure 6:
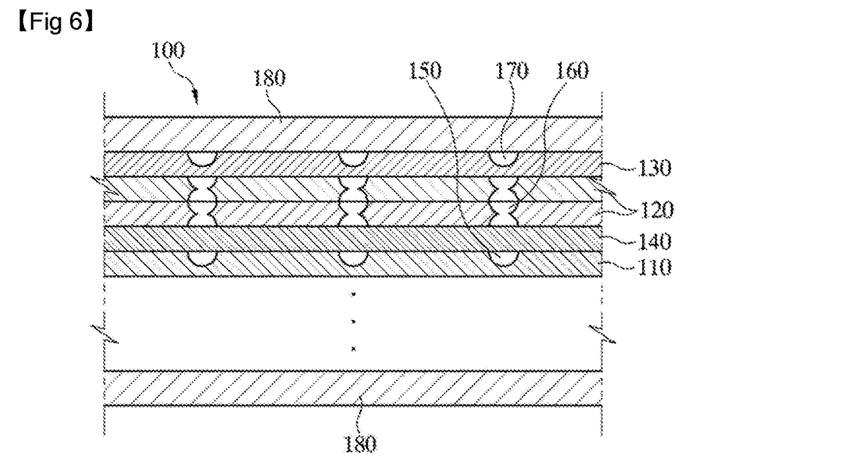
FIG. 6 is a front cross-sectional view of a 3-D channel gas heat exchanger in accordance with a second embodiment of the present invention.

Meanwhile, FIG. 6 is a front cross-sectional view of a 3-D channel gas heat exchanger 100 in accordance with a second embodiment of the present invention.

As shown in FIG. 6, the 3-D channel gas heat exchanger 100 in accordance with the second embodiment of the present invention includes a plurality of first, second, third, and fourth heat exchange plates 110, 120, 130, and 140 and covers 180 for supporting the first, second, third, and fourth heat exchange plates 110, 120, 130, and 140 in structure at both ends of the first, second, third, and fourth heat exchange plates.

More particularly, the first heat exchange plate 110 in which the semicircular passage grooves 112 are formed is disposed on one side of the fourth heat exchange plate 140, so that first passages 150 are formed. A pair of the second heat exchange plates 120 forming second passages 160 is disposed on the other side of the fourth heat exchange plate 140 so that the first passage 150 does not communicate with the second passage 160.

The pair of second heat exchange plates 120 is combined to form the second passages 160.

Furthermore, the third heat exchange plate 130 is disposed on the side of the second heat exchange plates 120 opposite to the side with which the fourth heat exchange plate 140 comes into contact, thus providing third passages 170.

As described above, the plurality of first, second, third, and fourth heat exchange plates 110, 120, 130, and 140 is disposed and both ends thereof are covered with the covers 180, thereby providing the 3-D channel gas heat exchanger 100 in accordance with the second embodiment of the present invention.

Figure 7:
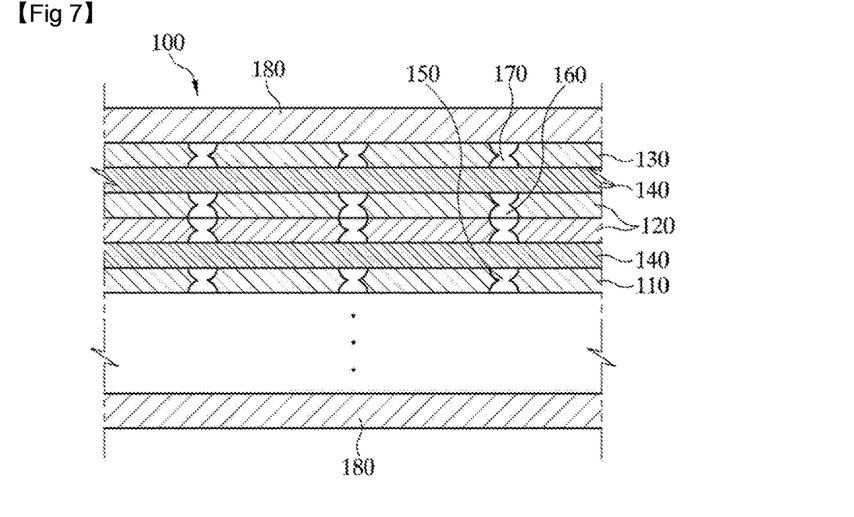
FIG. 7 is a front cross-sectional view of a 3-D channel gas heat exchanger in accordance with a third embodiment of the present invention.

Meanwhile, FIG. 7 is a front cross-sectional view of a 3-D channel gas heat exchanger 100 in accordance with a third embodiment of the present invention.

As shown in FIG. 7, the 3-D channel gas heat exchanger 100 in accordance with the third embodiment of the present invention includes first, second, and third heat exchange plates 110, 120, and 130 in each of which semicircular concave grooves are symmetrically formed up and down, fourth heat exchange plates 140, and covers 180 for supporting the first, second, third, and fourth heat exchange plates 110, 120, 130, and 140 in structure at both ends of the first, second, third, and fourth heat exchange plates. Here, the first, second, third, and fourth heat exchange plates 110, 120, 130, and 140 are stacked.

First, the first heat exchange plate 110 in which the passage grooves are formed by 3-D etching provide first passages 150.

Furthermore, a pair of the second heat exchange plates 120, each having the same shape as the first heat exchange plate 110, is combined to provide second passages 160 as shown in FIG. 7.

The third heat exchange plate 130 provides third passages 170 like in a process in which the first heat exchange plate 110 provides the first passages 150.

Furthermore, the fourth heat exchange plate 140 is interposed between the first and the second heat exchange plates 110 and 120 and between the second and third heat exchange plates 120 and 130 so that the second passages 160 of the second heat exchange plates 120 do not communicate with the first and third passages 150 and 170.

More particularly, the fourth heat exchange plates 140 are disposed on both sides of the first heat exchange plate 110 providing the first passages 150 so that the first passages 150 do not communicate with the second passages 160 of the second heat exchange plates 120.

Furthermore, the fourth heat exchange plates 140 are also disposed on both sides of the second heat exchange plates 120 providing the second passages 160 so that the first and the third passages 150 and 170 do not communicate with each other.

As described above, the plurality of first, second, third, and fourth heat exchange plates 110, 120, 130, and 140 is disposed and both ends thereof are covered with the covers 180, thereby providing the 3-D channel gas heat exchanger 100 in accordance with the third embodiment of the present invention.

An operating process of the 3-D channel gas heat exchanger 100 in accordance with the first embodiment of the present invention is described below with reference to FIG. 3.

First, a fluid having a low temperature(first fluid) and a heat exchange medium(second fluid) having a high temperature reach the 3-D channel gas heat exchanger 100 through an external pipe (not shown).

Next, the first fluid having a low temperature flows through the first passages 150 formed in the first heat exchange plate 110 of the heat exchanger 100, and the heat exchange medium that transfers the first fluid having a low temperature flows through the second passages 160 widely formed in the second heat exchange plates 120 by 3-D etching.

Heat is exchanged between the first fluid flowing through the first passages 150 of the first heat exchange plate 110 and the heat exchange medium flowing through the second passages 160 close to the first passages 150 more rapidly due to an eddy current phenomenon.

At this time, if the heat exchange medium flows through the second passages 160 at a specific reference or lower due to a freeze phenomenon, the fluid having a high temperature is transferred through the third passages 170 of the third heat exchange plate 130, that is, reserved passages, thus solving the freeze phenomenon so that the heat exchange medium can normally flow through the second passages 160.

Finally, the first fluid that flows through the first passages 150 is drained outside the 3-D channel gas heat exchanger 100 at a high temperature by means of the heat exchange, and the heat exchange medium having a high temperature that flows through the second passages 160 is drained outside the 3-D channel gas heat exchanger 100 at a low temperature by means of the heat exchange.

An example in which the 3-D channel gas heat exchangers 100 of the present invention are applied to a vaporization system is described below.

Figure 8:
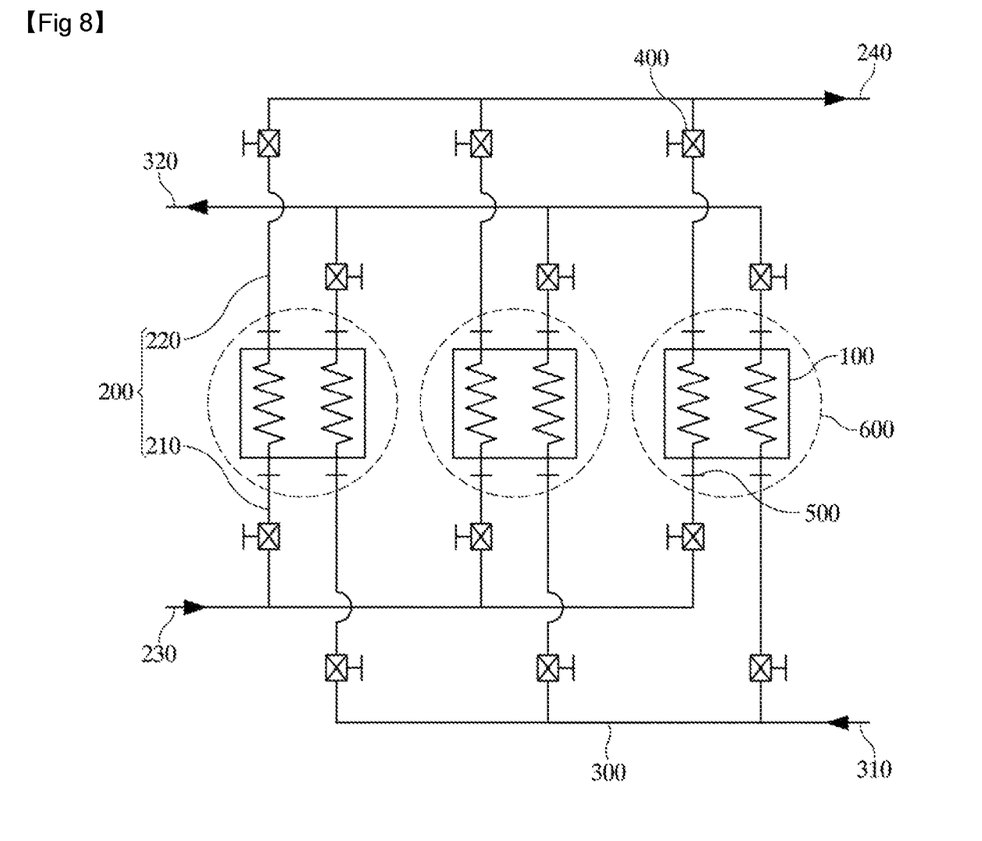
FIG. 8 is a circuit diagram of a vaporization system to which the 3-D channel gas heat exchangers of the present invention are applied.

First, FIG. 8 is a circuit diagram of the vaporization system to which the 3-D channel gas heat exchangers 100 of the present invention is applied.

As shown in FIG. 8, the vaporization system can include the heat exchangers 100, a pipe 200, a heat supply pipe 300, valves 400, flanges 500 and insulating boxes 600.

First, the pipe 200 includes a first pipe 210 through which LNG flows and a second pipe 220 through which natural gas vaporized through the heat exchanger 300 flows.

The heat supply pipe 300 includes a second inlet 310 and a second outlet 320. A heat exchange medium having a high temperature is introduced through the second inlet 310 and is then subject to a heat exchange process with LNG through some of the heat exchangers 100. The heat exchange medium is converted into a heat exchange medium having a low temperature and then drained to the second outlet 320.

The number of heat exchangers 100 included in the vaporization system can be 2 to 4. Each of the heat exchangers 100 has performance of 33 to 100%. One to three heat exchangers 100 can operate at normal times, but one or two additional heat exchangers 100 can operate, if necessary.

The flanges 500 are disposed within each of the insulating boxes 600 and are configured to repair the heat exchanger 100 and perform recognition and ventilation when leakage occurs.

The insulating box 600 is disposed outside the heat exchanger 300 and is configured to prevent the heat exchanger 300 from coming into contact with external air through vacuum and insulation in order to prevent dew condensation or icing occurring outside the heat exchanger 100.

An operating process of the vaporization system is described below. First, a heat exchange medium having a high temperature is supplied through the second inlet 310. Next, LNG pressurized by a high pressure pump is supplied to only the heat exchangers 100 that are used through a first inlet 230 at an extremely low temperature (about −163).

An exit temperature of the supplied LNG when the LNG reaches the heat exchanger 100 through the pipe 200 and passes therethrough and a pressure difference generated when the heat exchange medium reaches the heat exchanger 100 through the pipe 200 and passes therethrough are measured. Whether or not a second passage 160 of the heat exchanger 100 is clogged is checked based on the measured exit temperature and pressure difference.

If, as a result of the check, a second passage 160 of the heat exchanger 100 is not clogged, whether or not pressure within the insulating box 600 has risen is checked.

If, as a result of the check, pressure within the insulating box 600 has not risen, heat is exchanged between the LNG and the heat exchange medium. In contrast, if, as a result of the check, pressure within the insulating box 600 has risen, the heat exchanger 100 having a problem is cut off and the reserved heat exchanger 100 is driven.

Next, after purging and venting the insulating box 600, the vacuum of the problematic heat exchanger 100 is recovered and the recovered heat exchanger 100 is used as a reserved heat exchanger 100.

Meanwhile, if a second passage 160 of the heat exchanger 100 is clogged in the above process, a problematic heat exchanger 100 is cut off and the reserved heat exchanger 100 is driven.

Freezing is recovered by supplying a heat exchange medium to the third passages 170 of the problematic heat exchanger 100, and the recovered heat exchanger 100 is used as a reserved heat exchanger 100.

Furthermore, the LNG generates a vaporization action by means of the heat exchange, and thus the LNG is changed into vaporized natural gas. The vaporized natural gas is drained through a first outlet 240. The heat exchange medium having a high temperature is drained through the second outlet 320 at a low temperature by means of the heat exchange.

Accordingly, when a phenomenon in which a heat source being used is frozen or clogged is generated in a second passage 160, a heat exchanger 100 being used switches into a reserved heat exchanger 100, with the result that natural gas fuel continues to be supplied. Furthermore, heat is supplied to the third passages 170, that is, reserved passages, in order to solve the freeze or clogging phenomenon occurring in the second passage 160, thereby enabling a normal operation. As a result, the safety of the vaporization system can be further increased.

An example in which the 3-D channel gas heat exchangers 100 of the present invention are applied to a gas plant is described below. A difference between the example in which the 3-D channel gas heat exchangers 100 of the present invention are applied to the gas plant and the example in which the 3-D channel gas heat exchangers 100 of the present invention are applied to the vaporization system is chiefly described, and a description of the same construction and actions is omitted or given in brief.

First, the 3-D channel gas heat exchanger 100 applied to the gas plant basically has the same construction as the 3-D channel gas heat exchanger 100 applied to the vaporization system.

The gas plant can include the heat exchangers 100, the pipe 200, the heat supply pipe 300, the valves 400, the flanges 500, and the insulating boxes 600.

The elements perform the same functions as those of the vaporization system.

In the gas plant, unlike in a gas plant for a vessel, cold water or a refrigerant, that is, a fluid having a low temperature, flows through the first pipe 210. The cold water becomes a high temperature through the heat exchanger 300 and thus flows through the second pipe 220.

Furthermore, referring to FIG. 3, cold water or a refrigerant, that is, a low temperature fluid, flows through the first passages 150. High temperature gas for transferring heat to the low temperature fluid flowing through the first passages 150 flows through the second passages 160.

An operating process of the gas plant is described in brief below. First, high temperature gas is supplied through the second inlet 310. Next, low temperature cold water is supplied to the heat exchanger 100 being used, through the first inlet 230.

Next, when a second passage 160 of the heat exchanger 100 is clogged, whether or not pressure within the insulating box 600 has risen is checked.

If, as a result of the check, pressure within the insulating box 600 has not risen, cold water and the high temperature gas are subject to heat exchange. If, as a result of the check, pressure within the insulating box 600 has risen, a problematic heat exchanger 100 is cut off and a reserved heat exchanger 100 is driven.

Next, after purging and venting the insulating box 600, the problematic heat exchanger 100 is vacuumed and recovered and is then used as a reserved heat exchanger 100.

Meanwhile, if a second passage 160 is clogged in the above process, a problematic heat exchanger 100 is cut off and a reserved heat exchanger 100 is driven.

Freezing is solved by supplying high temperature gas to the third passages 170 of the problematic heat exchanger 100, and the recovered heat exchanger 100 is used as a reserved heat exchanger 100.

Furthermore, cold water becomes high temperature water by means of the heat exchange, and the water is drained through the first outlet 240. The high temperature gas is drained through the second outlet 320 at a low temperature by means of the heat exchange.

The aforementioned 3-D channel gas heat exchanger 100 is not limited to the constructions and methods of the aforementioned embodiments, but some or all of the embodiments may be selectively combined so that the embodiments are modified in various ways.

The detailed description above describes a three-dimensional (3-D) channel gas heat exchanger. The invention is not limited, however, to the precise embodiments and variations described. Various changes, modifications and equivalents can effected by one skilled in the art without departing from the spirit and scope of the invention as defined in the accompanying claims. It is expressly intended that all such changes, modifications and equivalents which fall within the scope of the claims are embraced by the claims.

What is claimed is:

1. A method of operating a 3-D channel gas heat exchanger in which the 3-D channel gas heat exchanger comprises: a plurality of heat exchange plates for exchanging heat on opposite sides of the heat exchange plates; and a plurality of passages between the plurality of heat exchange plates, the plurality of passages comprising first passages, second passages and third passages, the method comprising:

conveying a first fluid having a first temperature through the first passages of the 3-D channel gas heat exchanger;

conveying a second fluid through the second passages;

conducting heat exchange between the first fluid and the second fluid to transfer heat to the first fluid having the first temperature; and preventing freezing in the second passages by conveying a freezing-preventing fluid through the third passages and transferring heat from the fluid in the third passages to the second fluid in the second passages when a temperature of the second fluid is below a predetermined temperature.

2. The method according to claim 1, wherein during the conveying of the first fluid having the first temperature and the conveying of the second fluid, the first temperature of the first fluid is lower than a temperature of the second fluid being conveyed along the second passage.

3. The method according to claim 1, wherein each of the second passages is located between one of the first passages and one of the third passages.

4. The method according to claim 1, wherein the plurality of heat exchange plates comprises:

a first heat exchange plate configured to form the first passages;

a second heat exchange plate adjacent the first heat exchange plate and configured to form the second passages; and a third heat exchange plate adjacent the second heat exchange plate and configured to form the third passages.

5. The method according to claim 4, wherein the first, second and third heat exchange plates are stacked, the third heat exchange plate configured to form the third passages being disposed on one side of the second heat exchange plate, and the first heat exchange plate configured to form the first passages being disposed on a side of the second heat exchange plate opposite the one side of the second heat exchange plate.

6. The method according to claim 1, wherein the 3-D channel gas heat exchanger is positioned in a vessel, the first fluid is liquefied natural gas, and the second fluid is at least one of water, steam, and a mixture of water and antifreeze.

7. The method according to claim 1, wherein the 3-D channel gas heat is positioned in a gas plant, the first fluid is at least one of propane, ethane, ammonia, and water, and the second fluid is a gas.

* * * * *